United States Patent
Ito et al.

(10) Patent No.: US 9,073,444 B2
(45) Date of Patent: Jul. 7, 2015

(54) BATTERY CHARGING SYSTEM FOR VEHICLE AND BATTERY CHARGE CONTROLLER IN THE SAME

(75) Inventors: Akira Ito, Nukata-gun (JP); Mitsuru Fujita, Kuwana (JP); Shinji Katoh, Anjo (JP); Kenichi Tanaka, Nagoya (JP); Yukitsugu Sakaguchi, Anjo (JP)

(73) Assignees: DENSO CORPORATION, Kariya (JP); CAPTEX CO., LTD., Nagoya-shi (JP)

(*) Notice: Subject to any disclaimer, the term of this patent is extended or adjusted under 35 U.S.C. 154(b) by 477 days.

(21) Appl. No.: 13/532,957

(22) Filed: Jun. 26, 2012

(65) Prior Publication Data

US 2012/0326667 A1  Dec. 27, 2012

(30) Foreign Application Priority Data

Jun. 27, 2011 (JP) ................. 2011-141932

(51) Int. Cl.
*H02J 7/00* (2006.01)
*B60L 11/18* (2006.01)
*B60L 1/00* (2006.01)

(52) U.S. Cl.
CPC .......... *B60L 11/1838* (2013.01); *H02J 7/0004* (2013.01); *H02J 7/0068* (2013.01); *H02J 7/007* (2013.01); *B60L 1/00* (2013.01); *Y02T 10/7005* (2013.01); *Y02T 90/163* (2013.01); *Y02T 90/14* (2013.01); *Y02T 90/128* (2013.01); *Y02T 90/121* (2013.01)

(58) Field of Classification Search
CPC ... Y02T 90/14; Y02T 10/7005; Y02T 90/128; Y02T 10/7088; Y02T 90/163
USPC ......................................... 320/109
See application file for complete search history.

(56) References Cited

U.S. PATENT DOCUMENTS

| | | | |
|---|---|---|---|
| 2005/0093520 A1* | 5/2005 | Muramatsu et al. | 322/29 |
| 2006/0022643 A1* | 2/2006 | Brost et al. | 320/132 |
| 2009/0067205 A1 | 3/2009 | Oyobe et al. | |
| 2010/0198440 A1* | 8/2010 | Fujitake | 701/22 |
| 2011/0260531 A1 | 10/2011 | Obayashi et al. | |

FOREIGN PATENT DOCUMENTS

| | | |
|---|---|---|
| JP | 07-194015 | 7/1995 |
| JP | 2007-195336 | 8/2007 |
| JP | 2007-318970 | 12/2007 |
| JP | 2009-201170 | 9/2009 |
| JP | 2011-083076 | 4/2011 |
| JP | 2011-250670 | 12/2011 |

OTHER PUBLICATIONS

Office Action (2 pages) dated Mar. 11, 2014, issued in corresponding Japanese Application No. 2011-141932 and English translation (2 pages).

* cited by examiner

Primary Examiner — Arun Williams
(74) *Attorney, Agent, or Firm* — Nixon & Vanderhye P.C.

(57) ABSTRACT

A battery charging system for a vehicle, capable of charging a vehicle battery pack properly in a short time even during driving a vehicle-mounted electrical load. The battery charging system includes the battery pack mounted in the vehicle, the vehicle-mounted electrical load that can be driven by a current from the battery pack, and a battery charge controller that controls charging of the battery pack. When the battery pack is charged by using an external battery charger during operation of the load, the battery charge controller requires the external battery charger to supply a sum current that is a sum of a current for charging the battery pack and a current for driving the load to the vehicle.

14 Claims, 5 Drawing Sheets

BATTERY CHARGING SYSTEM FOR VEHICLE AND BATTERY CHARGE CONTROLLER IN THE SAME

CROSS-REFERENCE TO RELATED APPLICATION

This application is based on and claims the benefit of priority from earlier Japanese Patent Application No. 2011-141932 filed Jun. 27, 2011, the description of which is incorporated herein by reference.

BACKGROUND

1. Technical Field

This invention relates to a battery charging system for charging a vehicle battery pack with an external battery charger.

2. Related Art

A conventional power-supply apparatus for a vehicle, as disclosed in Japanese Patent Application Laid-Open Publication No. 2007-195336, includes an inverter for driving an air-conditioner compressor and charging a vehicle battery pack via a charging socket, and a connection unit for connecting the inverter to either one of the air-conditioner compressor and the charging socket. In the disclosed power-supply apparatus, only either one of the air-conditioner compressor and the charging socket is allowed to be electrically connected to the inverter, which allows the inverter to be shared to thereby reduce a weight of the power-supply apparatus.

However, even when the vehicle battery pack is being charged, an in-vehicle occupant may wish to drive the air-conditioner compressor. In addition, in the case of a refrigerated vehicle or an insulated vehicle, the air-conditioner compressor may have to be driven to keep a shipment at a cooler temperature even during charging the vehicle battery pack. Hence, the disclosed power-supply apparatus suffers from a disadvantage that an electrical load mounted in the vehicle, such as the air-conditioner compressor, cannot be driven during charging the vehicle battery pack.

Since electrical power accumulated in the vehicle battery pack is consumed by the electrical load when the electrical load is driven during charging the vehicle battery pack, the above disclosed power-supply apparatus suffers from another disadvantage that it takes more time to complete the charging. Further, when the electrical load is driven during charging the vehicle battery pack, a behavior of the electrical load may cause an abnormally large current to flow into the vehicle battery pack, which may reduce the battery life significantly.

In consideration of the foregoing, exemplary embodiments of the present invention are directed to providing a battery charging system for a vehicle that allows a vehicle mounted electrical load to be driven even during charging a vehicle battery pack and is capable of charging the vehicle battery pack properly in a short time.

SUMMARY

In accordance with an exemplary embodiment of the present invention, there is provided a battery charging system for a vehicle, including: a battery pack mounted in the vehicle; a vehicle-mounted electrical load that can be driven by a current from the battery pack; and a battery charge controller that controls charging of the battery pack. When the battery pack is charged by using an external battery charger during operation of the load, the battery charge controller requires the external battery charger to supply a sum current that is a sum of a current for charging the battery pack and a current for driving the load to the vehicle.

In the above battery charging system, when the vehicle battery pack is charged by using the external battery charger during operation of the vehicle-mounted electrical load, the controller requires the external battery charger to supply a sum current that is a sum of a current for charging the vehicle battery pack and a current for driving the electrical load. This leads to the sum current supplied from the vehicle battery charger to the battery charging system on demand. The current for charging the vehicle battery pack can thus be ensured even during driving the electrical load since the controller requires the external battery charger to supply the sum current. Accordingly, optimal charging of the vehicle battery pack can be completed in a short time even during driving the load.

In accordance with another exemplary embodiment of the present invention, there is provided a battery charge controller for controlling charging of a battery pack mounted in a vehicle, including: a sum current calculator that calculates a sum current that is a sum of a current for charging the battery pack and a current for driving a vehicle-mounted electrical load; and a current requester that, when the battery pack is charged by using an external battery charger during operation of the load, requires the external battery charger to supply the sum current calculated by the sum current calculator to the vehicle.

In this manner, a battery charge controller for controlling charging of a battery pack mounted in a vehicle according to the embodiment of the present invention may be implemented.

DESCRIPTION OF SPECIFIC EMBODIMENTS

The present invention will be described more fully hereinafter with reference to the accompanying drawings. Like numbers refer to like elements throughout.

First Embodiment

Figure 1:
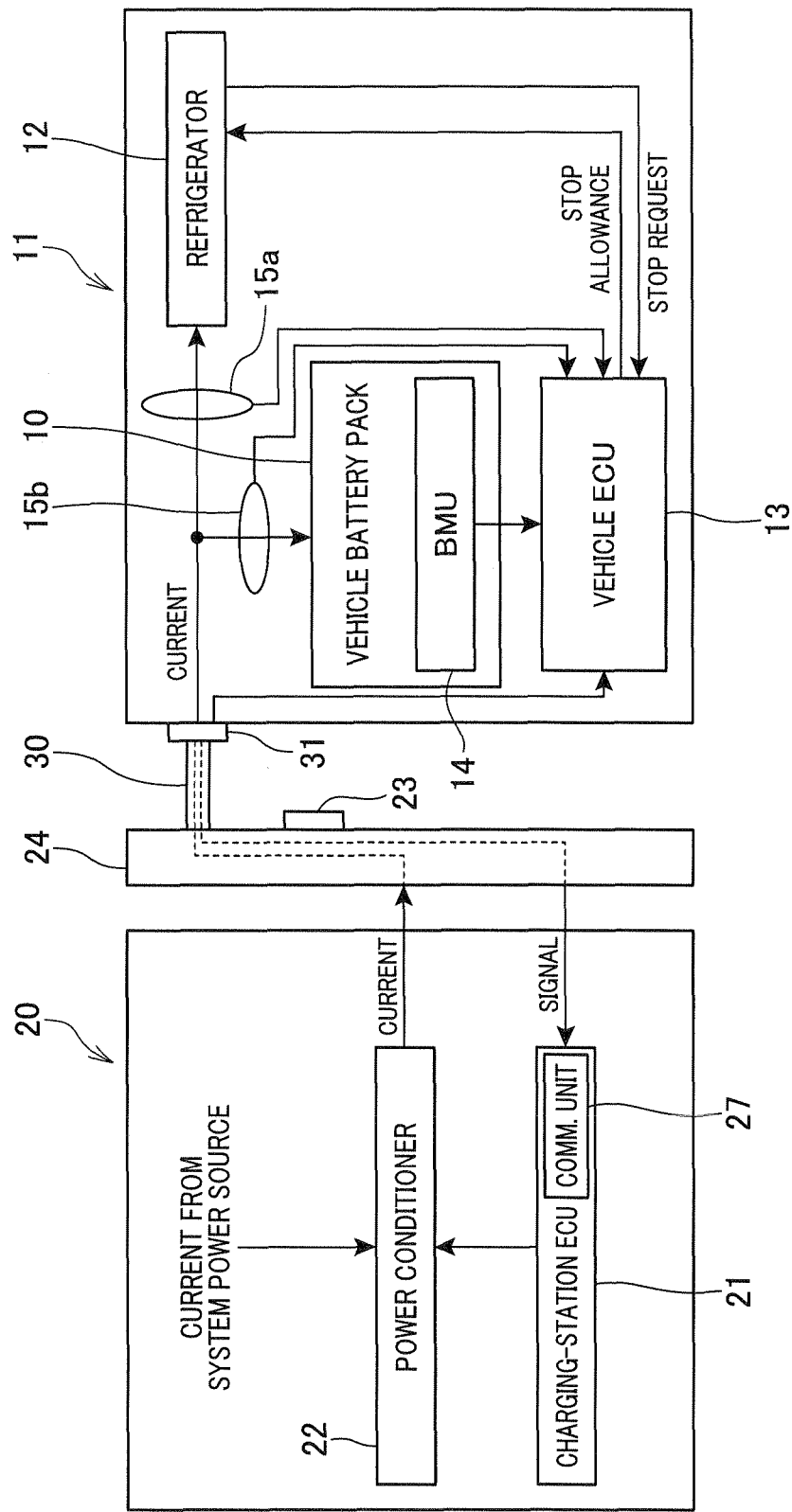
FIG. 1 schematically shows a block diagram of a battery charging system for a vehicle and a charging station in accordance with one of first to third embodiments of the present invention.

There will now be explained a battery charging system 11 for a vehicle in accordance with a first embodiment of the present invention with reference to FIGS. 1, 2. FIG. 1 schematically shows a block diagram of the battery charging system 11 and a charging station 20. The battery charging system 11 is adapted to charge a vehicle battery pack 10 with an electrical current supplied from an external power source, such as the charging station 20, to a vehicle having the battery charging system 11 mounted therein. In the present embodiment, the vehicle is a refrigerated vehicle equipped with a refrigerator 12. The battery charging system 11 includes the vehicle battery pack 10, an Electronic Control Unit (ECU) 13 (hereinafter referred to as a vehicle ECU), the refrigerator 12, a first current detector 15a, and a second current detector 15b.

The vehicle battery pack 10 can be charged with a direct electrical current and can discharge accumulated electrical power. The vehicle battery pack 10 includes an assembled battery formed of a plurality of battery cells, such as lithium-ion secondary batteries or others. The vehicle battery pack 10 is electrically connected to the refrigerator 12, which is an electrical load, to supply a drive current to the refrigerator 12.

The vehicle battery pack 10 includes a battery management unit (BMU) 14. The BMU 14 is adapted to monitor a battery state of the vehicle battery pack 10 and calculate a change in battery voltage, a variation in battery voltage, and a transferred amount of charge of the vehicle battery pack 10. Similarly to the vehicle ECU 13, the BMU 14 includes input ports (not shown), a microcomputer (not shown), and output ports (not shown). The microcomputer includes a memory (storage means) in which data on the battery state is stored continuously. The stored battery state data includes, but are not limited to, a value of battery voltage, values of charge and discharge currents, and a value of battery temperature. On the basis of the stored data, the BMU 14 calculates and stores a state of charge (SOC) and a depth of discharge (DOD) and the like of the vehicle battery pack 10 as a function of a change in discharge current, and outputs, to the vehicle ECU 13, various kinds of information including the battery temperature, cell voltages, a total battery voltage, and a variation in battery voltage as well as the SOC and DOD.

The first current detector 15a is included in a circuit that electrically connects the refrigerator 12 and the vehicle battery pack 10. The first current detector 15a is adapted to detect a value of electrical current following through the circuit. The first current detector 15a is electrically connected to the vehicle ECU 13. The value of electrical current detected by the first current detector 15a is outputted to the vehicle ECU 13. In the present embodiment, the first current detector 15a detects a value of electrical current supplied to the refrigerator 12.

The second current detector 15b is included in a power I/O circuit of the vehicle battery pack 10. The second current detector 15b is adapted to detect a value of electrical current following through the power I/O circuit. The second current detector 15b is electrically connected to the vehicle ECU 13. The values of charging and discharging currents detected by the second current detector 15b are outputted to the vehicle ECU 13. In the present embodiment, the second current detector 15b detects values of charging and discharging currents of the vehicle battery pack 10. The current detectors 15a, 15b detect currents flowing through the respective circuits, for example, by means of a current transformer (CT) or a shunt resistor.

The refrigerator 12 is electrically connected to the vehicle battery pack 10. The refrigerator 12 includes a refrigeration-cycle arrangement (not shown), which is an electrical load powered by the vehicle battery pack 10. The refrigeration-cycle arrangement is adapted to control or regulate an inside temperature of a refrigerated compartment mounted in the refrigerated vehicle. The refrigeration-cycle arrangement includes a compression motor for discharging a refrigerant at elevated temperature and pressure, an inside fan for facilitating heat exchange between air inside the refrigerated compartment and the refrigerant, and an outside fan for facilitating heat exchange between air outside the refrigerated compartment and the refrigerant. These components of the refrigeration-cycle arrangement need to be always ready to operate so as to maintain the inside of the refrigerated compartment at a cooler temperature. Even when the vehicle battery pack 10 is being charged, the refrigeration-cycle arrangement needs to be supplied with an electrical current to maintain the inside of the refrigerated compartment at such a cooler temperature. It should be noted that, since a load of the refrigerator 12 is less varied, a power consumption of the refrigerator 12 decreases gradually as the inside temperature of the refrigerated compartment decreases.

The vehicle ECU 13 is electrically connected to the BMU 14 of the vehicle battery pack 10, the refrigerator 12, and the charging station 20 to communicate therewith and control these components when the vehicle battery pack 10 is charged. The vehicle ECU 13 outputs a control command to at least one of these components in response to a received instruction.

The vehicle ECU 13 includes input ports (not shown) that receives various signals, a microcomputer (not shown) that performs various operations in response to signals received at the input ports, and output ports (not shown) that outputs control signals for controlling the various components on the basis of operations performed by the microcomputer. The microcomputer includes one or more memories, such as a read-only memory (ROM), a random access memory (RAM) and the like, for storing various kinds of data, operation results of the microcomputer, and prescribed and/or updatable control programs, to perform various kinds of control processes.

There will now be explained a charging station 20. The charging station 20, which is a battery charger, is adapted to charge the vehicle battery pack 10 in constant current (CC) or constant voltage (CV) charge mode. The charging station 20 is placed in a parking place of a commercial facility, such as a convenience store, or in each of a plurality of parking places of a battery service station. The charging station 20 includes an ECU 21 (hereinafter referred to as a charging-station ECU) that controls various components of the charging station 20, a power conditioner 22 that inverts electrical power, a display (not shown) as an annunciator, an operating switch 23 for operating the various components, an emergency stop button for security, and a charging cable 30. The display, the operating switch 23, the emergency stop button, and the charging cable 30 are mounted on a charging bollard 24. A remaining amount of charge and a state of charge (SOC) of the vehicle battery pack 10 and the like are displayed on the display. In addition, a start of charging and an end of charging are indicated by operating the operating switch 23.

A charging connector 31, which is a connection terminal, is attached to a leading portion of the charging cable 30. The vehicle is provided with a charging socket (not shown) for receiving the charging connector 31. The vehicle battery pack 10 can be charged by inserting the charging connector 31 of the charging station 20 into the charging socket of the vehicle.

The power conditioner 22 is electrically connected to the charging-station ECU 21 and adapted to supply electrical power to the vehicle battery pack 10 under control of the charging-station ECU 21. The power conditioner 22 is electrically connected to a system power source (not shown) and converts system power into direct current (DC) power to supply the DC power to the vehicle battery pack 10 for charging the vehicle battery pack 10, where the DC power is boosted appropriately in the power conditioner 22 and the boosted DC power is supplied from the power conditioner 22 to the vehicle battery pack 10.

A charging power-line 25 is electrically connected to the power conditioner 22. An electrical current outputted from the power conditioner 22 flows through the charging power-line 25. The charging power-line 25 is in turn eclectically connected to the charging cable 30. The current outputted from the power conditioner 22 flows through the charging power-line 25, the charging cable 30, and the charging connector 31 in this order.

Similarly to the vehicle ECU 12, the charging-station ECU 21 includes input ports (not shown), a microcomputer (not shown), and output ports (not shown). The microcomputer includes one or more memories (a ROM, a RAM and the like) for storing control parameters, such as predefined constants and variables, and prescribed and/or updatable control programs, to perform various control processes. The charging-station ECU 21 is electrically connected to the power conditioner 22 and the charging cable 30.

The charging-station ECU 21 includes a communication unit 27 for communicating with the vehicle ECU 13 to control the power conditioner 22. The communication unit 27 is adapted to communicate with the vehicle via a communication cable 26 included in the charging cable 30. The charging-station ECU 21 communicates with the vehicle ECU 13 via the communication unit 27 to control charging of the vehicle battery pack 10.

The vehicle is provided with the charging socket for receiving the charging connector 31. The vehicle is electrically and mechanically connected to the charging connector 31 by inserting the charging connector 31 of the charging station 20 into the charging socket, so that the vehicle battery pack 10 and the power conditioner 22 are electrically connected to each other and the vehicle ECU 13 and the charging-station ECU 21 are electrically connected to each other. Upon insertion of the charging connector 31 into the charging socket, the charging-station ECU 21 is allowed to communicate with the vehicle via the communication cable 26 in the charging cable 30.

Once the charging of the vehicle battery pack 10 is started by operating the charging station 20, an electrical-current requirement is outputted from the vehicle to the charging station 20. The charging-station ECU 21 controls the power conditioner 22 to output an electrical current corresponding to the current requirement. The current outputted from the power conditioner 22 is supplied to the vehicle battery pack 10 mounted in the vehicle through the charging cable 30. This allows the vehicle battery pack 10 to be charged and supply electrical power to the electrical load, such as the refrigerator 12, on demand.

There will now be explained a charging process performed by the vehicle ECU 13 with reference to FIG. 2. The charging process is started with a start operation performed by operating the operating switch 23 immediately after electrical connection of the charging cable 30 to the vehicle during operation of the refrigerator 12.

In step S11, the vehicle ECU 13 requires the charging-station ECU 21 of the charging station 20 to supply a sum current which is a sum of a current for charging the vehicle battery pack 10 and a current for driving the refrigerator 12, and then the process proceeds to step S12. The sum current will then be supplied from the charging station 20 via the charging cable 30. This allows the refrigerator 12 to be operated during charging the vehicle battery pack 10.

More specifically, the vehicle ECU 13 calculates a sum current that the vehicle ECU 13 requires the charging-station ECU 21 to supply, on the basis of the SOC and DOD of the vehicle battery pack 10 and operating information (including the inside temperature of the refrigerated compartment) acquired from the refrigerator 12. When the operating information is not available from the refrigerator 12, the vehicle ECU 13 may predict a future operating status of the refrigerator 12 to calculate the sum current, on the basis of a change rate of electrical current flowing into the refrigerator 12 (di/dt), a relation between an outside-air temperature and an operating time of the refrigerator 12, and others. According to a basic algorithm, an optimal current can be calculated by means of proportional-integral-derivative (PID) control, which leads to an optimal charging environment for the vehicle battery pack 10.

In step S12, the vehicle ECU 13 determines whether or not a stop request for stopping or deactivating the refrigeration-cycle arrangement has been received from the refrigerator 12. If the stop request has been received from the refrigerator 12, then the process proceeds to step S13. If the stop request has not been yet received from the refrigerator 12, the operation in step S12 is repeated until reception of the stop request. The refrigerator 12 is adapted to output the stop request to the vehicle ECU 13, for example, when the inside temperature of the refrigerated compartment can be maintained at a cooler temperature for a short time without operating the refrigeration-cycle arrangement.

In step S13, the vehicle ECU 13 decreases the current requirement below the sum current and requires the charging-station ECU 21 to supply a current corresponding to the decreased current requirement, and then the process proceeds to step S14. The current corresponding to the decreased current requirement will be consumed for charging the vehicle battery pack 10.

In step S14, the vehicle ECU 13 acquires a value of a current detected by the first current detector 15a (hereinafter referred to as a first detected current) and a value of a current detected by the second current detector 15b (hereinafter referred to as a second detected current). Thereafter, the process proceeds to step S15, where the vehicle ECU 13 determines whether or not a sum of the first and second detected currents has been decreased below the sum current. If it is determined in step S15 that the sum of the first and second detected currents has been decreased below the sum current, then the process proceeds to step S16. On the other hand, if it is determined in step S15 that the sum of the first and second detected currents has not been yet decreased below the sum current, then the process returns to step S14.

When the sum of the first and second detected currents is decreased to the current corresponding to the decreased current requirement, a current supplied to the refrigerator 12 will be decreased accordingly. It can thus be confirmed that the current supplied from the charging station 20 has been decreased on demand. It should here be noted that the value of the second detected current is necessary to alter a charging current for charging the vehicle battery pack 10 as a function of the SOC of the vehicle battery pack 10.

Since the current supplied from the charging station 20 has been decreased, the vehicle ECU 13 issues a stop allowance to the refrigerator 12 in step S16. Thereafter, the process is ended. The stop request is thus accepted and the refrigerator 12 is allowed to stop or stop its operation.

Figure 2:
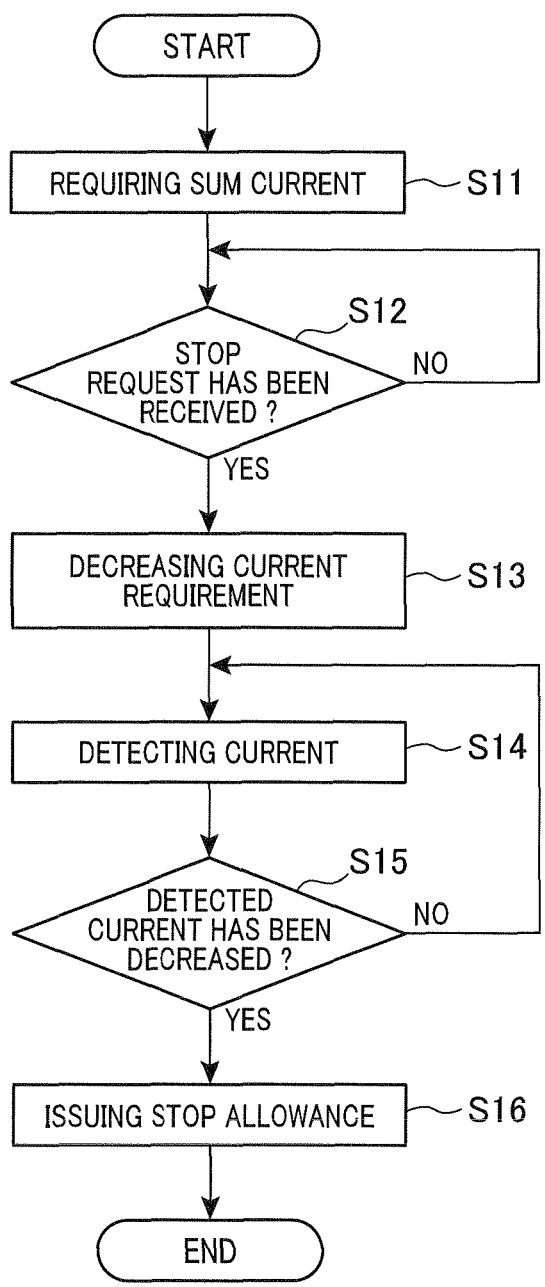
FIG. 2 shows a flowchart of a charging process performed by a vehicle ECU in accordance with the first embodiment.

In the charging process shown in FIG. 2, when the refrigerator 12 is in operation during charging the vehicle battery pack 10, the vehicle ECU 13 controls the refrigerator 12 upon reception of the stop request from the refrigerator 12 so that the refrigerator 12 is allowed to stop when the current from the charging station 20 is decreased to the current corresponding to the decreased current requirement. This can prevent the refrigerator 12 from stopping suddenly and the sum current from flowing into the vehicle battery pack 10 as an overcurrent.

The charging process shown in FIG. 2 is performed during operation of the refrigerator 12. When the refrigerator 12 is in a stopped state, the vehicle ECU 13 requires the charging-station ECU 21 to supply a current required to charge the vehicle battery pack 10. This allows the vehicle battery pack 10 to be charged. When the refrigerator 12 is activated during charging the vehicle battery pack 10, the vehicle ECU 13 requires the charging-station ECU 21 to supply the sum current, after activation of the refrigerator 12, which allows the vehicle battery pack 10 to be charged while driving the refrigerator 12.

In addition, in the charging process shown in FIG. 2, when the charging is completed (i.e., the vehicle battery pack 10 is fully charged), the vehicle ECU 13 requires the charging-station ECU 21 to supply a current required to operate the refrigerator 12, which allows the refrigerator 12 to be operated without consuming electrical power accumulated in the vehicle battery pack 10. When the refrigerator 12 stops while the vehicle battery pack 10 is in a fully charged state, the vehicle ECU 13 requires the charging-station ECU 21 to supply neither a current for operating the refrigerator 12 nor a current for charging the vehicle battery pack 10 since the vehicle battery pack 10 is fully charged.

Second Embodiment

There will now be explained a battery charging system 11 for a vehicle in accordance with a second embodiment of the present invention with reference to FIGS. 1, 3. Only differences of the second embodiment from the first embodiment will be explained. FIG. 1 is also a block diagram of a battery charging system and a charging station in accordance with the second embodiment.

Figure 3:
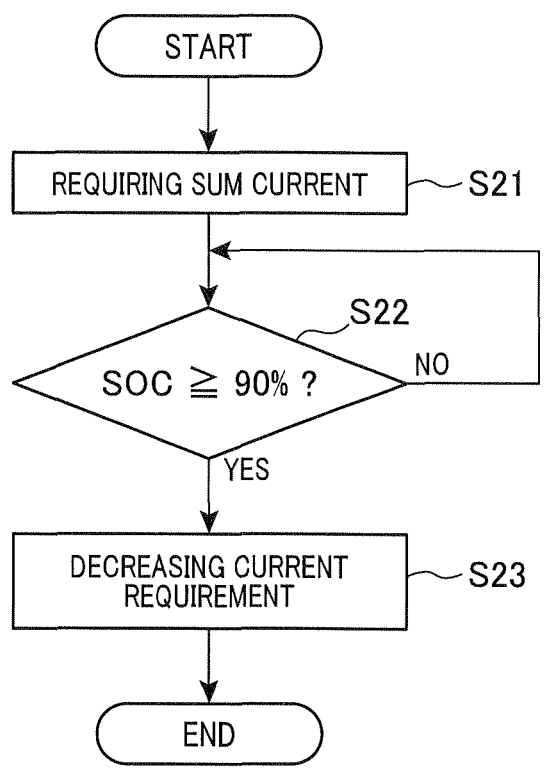
FIG. 3 shows a flowchart of a charging process performed by a vehicle ECU in accordance with the second embodiment.

FIG. 3 shows a flowchart of a charging process performed by the vehicle ECU 13 in accordance with a second embodiment. The charging process is started with a start operation performed by operating the operating switch 23 immediately after electrical connection of the charging cable 30 to the vehicle during operation of the refrigerator 12.

In step S21, the vehicle ECU 13 requires the charging-station ECU 21 to supply a sum current that is a sum of a current for charging the vehicle battery pack 10 and a current for driving the refrigerator 12. Subsequently, the process proceeds to step S22, where the vehicle ECU 13 determines whether or not a state of charge (SOC) of the vehicle battery pack 10 is equal to or larger than 90%. If the SOC is below 90%, then the operation in step S22 is repeated until the SOC becomes equal to or larger than 90%. If the SOC is equal to or larger than 90%, then the process proceeds to step S23, where the vehicle ECU 13 decreases a current requirement below the sum current and down to a current required to drive the refrigerator 12, since the vehicle battery pack 10 can be considered almost fully charged. The process is then ended.

Unlike the charging process shown in FIG. 2 in accordance with the first embodiment, when the refrigerator 12 stops suddenly without issuing the stop request, the sum current will flow into the vehicle battery pack 10. In such a case, when there exists a sufficient margin in the SOC of the vehicle battery pack 10, the sum current is allowed to flow into the vehicle battery pack 10. On the other hand, when the SOC of the vehicle battery pack 10 is close to 100% (almost fully charged), the sum current is not allowed to flow into the vehicle battery pack 10. Therefore, for example, when the SOC becomes equal to or larger than 90%, the vehicle ECU 13 decreases a current requirement below the sum current to decrease the current for charging the vehicle battery pack 10. This allows a current corresponding to the decreased current requirement to flow into the vehicle battery pack 10 even when the refrigerator 12 stops suddenly at the SOC close to 100%.

In addition, in the process shown in FIG. 3, the vehicle ECU 13 can prevent an overcurrent from flowing into the vehicle battery pack 10 without receiving the stop request from the refrigerator 12 and transmitting the stop allowance signal to the refrigerator 12.

Third Embodiment

There will now be explained a battery charging system 11 for a vehicle in accordance with a third embodiment of the present invention with reference to FIGS. 1, 4. Only differences of the third embodiment from the first or second embodiment will be explained. FIG. 1 is also a block diagram of a battery charging system and a charging station in accordance with the third embodiment.

Figure 4:
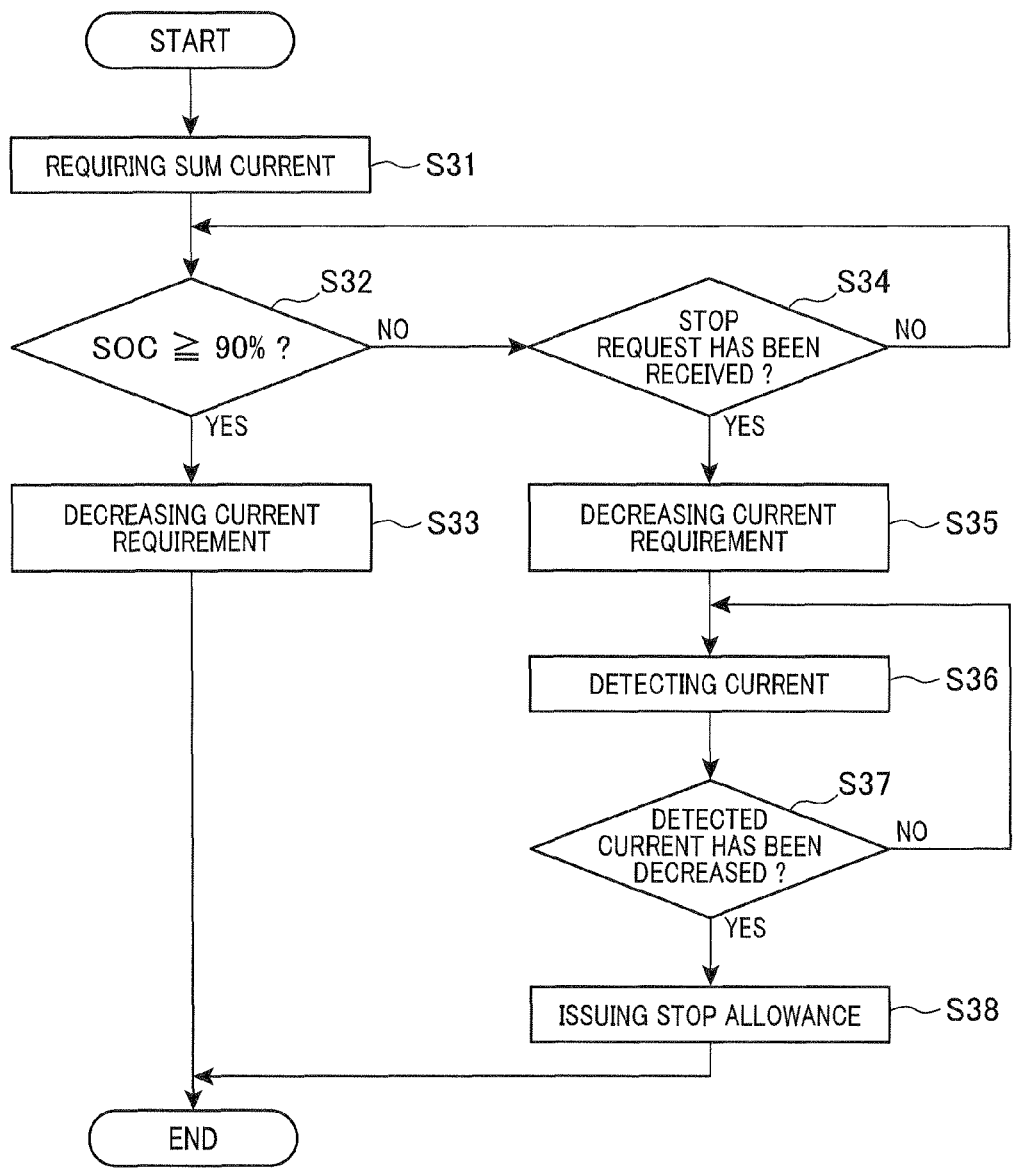
FIG. 4 shows a flowchart of a charging process performed by a vehicle ECU in accordance with the third embodiment.

FIG. 4 shows a flowchart of a charging process performed by the vehicle ECU 13 in accordance with a third embodiment. The charging process is started with a start operation performed by operating the operating switch 23 immediately after electrical connection of the charging cable 30 to the vehicle during operation of the refrigerator 12.

In step S31, the vehicle ECU 13 requires the charging-station ECU 21 to supply a sum current that is a sum of a current for charging the vehicle battery pack 10 and a current for driving the refrigerator 12. Subsequently, the process proceeds to step S32, where the vehicle ECU 13 determines whether or not a state of charge (SOC) of the vehicle battery pack 10 is equal to or larger than 90%. If the SOC is equal to or larger than 90%, then the process proceeds to step S33, where the vehicle ECU 13 decreases a current requirement below the sum current and requires the charging-station ECU 21 of the charging station 20 to supply a current corresponding to the decreased current requirement since the vehicle battery pack 10 can be considered almost fully charged. The process is then ended. If the SOC is below 90%, then the process proceeds to step S34, where the vehicle ECU 13 determines whether or not a stop request for stopping the refrigeration-cycle arrangement has been received from the refrigerator 12. If the stop request has been received from the refrigerator 12, then the process proceeds to step S35. If the stop request has not been yet received from the refrigerator 12, the operation in step S32 is repeated.

In step 35, the vehicle ECU 13 decreases the current requirement below the sum current and requires the charging-station ECU 21 to supply a current corresponding to the decreased current requirement that is consumed for charging the vehicle battery pack 10, and then the process proceeds to step S36.

In step S36, the vehicle ECU 13 acquires a value of a current detected by the first current detector 15a (a first detected current) and a value of a current detected by the second current detector 15b (a second detected current). Thereafter, the process proceeds to step S37, where the vehicle ECU 13 determines whether or not a sum of the first and second detected currents has been decreased below the sum current. If it is determined in step S37 that the sum of the first and second detected currents has been decreased below the sum current, then the process proceeds to step S38. On the other hand, if it is determined in step S37 that the sum of the first and second detected currents has not been yet decreased below the sum current, then the process returns to step S36. In step S38, since the current supplied from the charging station 20 has been decreased to the current for charging the vehicle battery pack 10 below the sum current, the vehicle ECU 13 issues a stop allowance to the refrigerator 12. Thereafter, the process is ended.

According to the charging process shown in FIG. 4, when the SOC of the vehicle battery pack 10 is close to 100% (almost fully charged), the sum current is not allowed to flow into the vehicle battery pack 10 when the refrigerator 12 stops suddenly whether with or without the stop request being issued, since there exists few margin in the SOC of the vehicle battery pack 10. Therefore, for example, when the SOC becomes equal to or larger than 90%, the vehicle ECU 13 decreases the current requirement to decrease the current for charging the vehicle battery pack 10.

On the other hand, when there exists a sufficient margin in the SOC of the vehicle battery pack 10 (for example, when the SOC is below 90%), the vehicle ECU 13 controls the refrigerator 12 upon reception of the stop request from the refrigerator 12 so that the refrigerator 12 is allowed to stop when the current from the charging station 20 is decreased to the current corresponding to the decreased current requirement that is consumed for charging the vehicle battery pack 10. This can reliably prevent the sum current from flowing into the vehicle battery pack 10 suddenly, thereby reliably protecting the vehicle battery pack 10. Further, even in cases where the refrigerator 12 stops suddenly without issuing the stop request when there exists a sufficient margin in the SOC of the vehicle battery pack 10, the vehicle battery pack 10 is allowed to be charged with the sum current.

Advantages of the Embodiments

As described above, in the battery charging system 11 in accordance with each of the first to third embodiments, when the vehicle ECU 13 charges the vehicle battery pack 10 by using the external charging station 20, the vehicle ECU 13 requires the charging-station ECU 21 of the charging station 20 to supply a sum current that is a sum of a current for charging vehicle battery pack 10 and a current for operating the refrigerator 12. The charging-station ECU 21 supplies the sum current to the battery charging system 11 on demand, so that the current for charging the vehicle battery pack 10 is ensured even during operation of the refrigerator 12. In other words, the refrigerator 12 can be operated even during charging the vehicle battery pack 10 and the current for charging the vehicle battery pack 10 can be ensured. Accordingly, the charging of the vehicle battery pack 10 can be completed in a short time even during operation of the refrigerator 12.

When the refrigerator 12 stops suddenly during charging the vehicle battery pack 10 with the sum current, the sum current will flow into the vehicle battery pack 10 as an overcurrent. Such an overcurrent may burden the vehicle battery pack 10.

As a solution to such a problem, in the charging process shown in FIG. 2 in accordance with the first embodiment, the refrigerator 12 is adapted to issue a stop request before stopping. When the vehicle ECU 13 receives the stop request from the refrigerator 12 during charging the vehicle battery pack 10 when the refrigerator 12 is in operation, the vehicle ECU 13 requires the charging-station ECU 21 of the charging station 20 to supply a current corresponding to the decreased current requirement, where the current corresponding to the decreased current requirement is smaller than the sum current and consumed for charging the vehicle battery pack 10. When a current supplied from the charging station 20 decreases to the current corresponding to the decreased current requirement, the vehicle ECU 13 controls the refrigerator 12 to stop by issuing the stop allowance to the refrigerator 12. That is, the refrigerator 12 stops reliably after a current supplied from the charging station 20 is decreased properly below the sum current, which can prevent the sum current from flowing into the vehicle battery pack 10.

As described above, when the refrigerator 12 stops suddenly during charging the vehicle battery pack 10 with the sum current, the sum current will flow into the vehicle battery pack 10 as an overcurrent. Such an overcurrent may burden the vehicle battery pack 10.

As another solution to such a problem, in the charging process shown in FIG. 3 in accordance with the second embodiment, when the state of charge (SOC) of the vehicle battery pack 10 is not close to the fully charged level that is a SOC of 100% (for example, the SOC is smaller than 90%), then the vehicle battery pack 10 is allowed to be charged with an optimized charging current acceptable to the charging station 20 (more specifically, the power conditioner 22) when the sum current flows into the vehicle battery pack 10 after sudden stop of the refrigerator 12. On the other hand, when the SOC of the vehicle battery pack 10 is close to the fully charged level (for example, the SOC is equal to or larger than 90%), then the vehicle ECU 13 decreases the current requirement properly below the sum current and requires the charging-station ECU 21 of the charging station 20 to supply a current corresponding to the decreased current requirement, which can prevent the sum current from flowing into the vehicle battery pack 10 suddenly as an overcurrent, thereby protecting the vehicle battery pack 10.

In the second embodiment, whether or not the SOC is close to the fully charged level is determined on the basis of whether or not the SOC is equal to or larger than 90%. Alternatively, whether or not the SOC is close to the fully charged level may be determined by any other criterion defined on the basis of whether or not the sum current is allowed for charging the vehicle battery pack 10.

In each of the first to third embodiments, when the vehicle battery pack 10 is charged, the battery charging system 11 is mechanically and electrically connected to the charging station 20 via the charging cable 30 of the charging station 20 so that an electrical current can be supplied from the charging station 20 to the battery charging system 11 via the charging cable 30. The vehicle ECU 13 communicates with the charging-station ECU 21 of the charging station 20 via the same charging cable 30 to transmit the current requirement to the charging-station ECU 21. The signal line for communications and the power line for supplying electrical power are bundled in the charging cable 30 terminated with the connector 31 so that what has to be done in preparation for charging the vehicle battery pack 10 is only to connect the charging cable 30 to the vehicle, which simplifies preliminary work. That is, there is no need for preparing two separate cables: one is dedicated to charging the vehicle battery pack 10 and the other is dedicated to driving the refrigerator 12. This allows the refrigerator 12 to be operated during charging the vehicle battery pack 10 via the charging cable 30.

In the battery charging system 11 in accordance with each of the first to third embodiments of the present invention, the charging of the vehicle battery pack 10 and the driving of the refrigerator 12 can be performed simultaneously by using a specific interface (I/F) between the charging station 20 and the vehicle in conformity with an interface standard, such as the CHAdeMO® standard. Hence, what has to be done in preliminary work for charging the vehicle battery pack 10 is only to connect the charging cable 30 to the vehicle and there is no need for preparing two separate cables, that is, a charging cable dedicated to charging the vehicle battery pack 10 and a drive cable dedicated to driving the refrigerator 12, which may lead to enhancement of handleability. Particularly, in the case of a commercial vehicle, the enhancement of handleability is considered very important since an amount of time for dropping by a charging facility, such as a battery service station, is limited.

In the case of a refrigerated vehicle that can be powered by the vehicle battery pack 10, it is desired that charging of the vehicle battery pack 10 and driving of the refrigerator 12 can be performed simultaneously. Preferably, the refrigerator 12 can be powered by an external power source when the vehicle battery pack 10 is charged by the same power source. To this end, the external power source (the charging station 20 in the above embodiments) is required to supply to the vehicle a sum current that is a sum of a current for the charging vehicle battery pack 10 and a current for driving the refrigerator 12. This leads to simplification of the I/F and common use of a communication protocol.

When the refrigerator 12 stops suddenly when the vehicle is being supplied with the sum current, the sum current is likely to flow into the vehicle battery pack 10 as an overcurrent. Such an overcurrent may burden the vehicle battery pack 10, which may lead to a decrease in battery life.

To avoid such a situation, in the battery charging system 11 in accordance with the first embodiment of the present invention, the vehicle ECU 13 receives a stop request signal from the refrigerator 12 (for example, a drive ECU (not shown) in the refrigerator) prior to stop of the refrigerator 12 and replies a stop allowance signal to the refrigerator 12 after a current supplied from the charging station 20 has decreased to a current for charging the vehicle battery pack 10 that is smaller than the sum current.

Alternatively, in the battery charging system 11 in accordance with the second embodiment of the present invention, the SOC of the vehicle battery pack 10 is controlled so that there is always a sufficient margin in SOC of the vehicle battery pack 10 such that an optimized charging current acceptable to the charging station 20 is allowed to flow into the vehicle battery pack 10.

Still alternatively, in the battery charging system 11 in accordance with the third embodiment of the present invention, the vehicle ECU 13 controls the refrigerator 12 to stop upon reception of the stop allowance from the vehicle ECU 13, thereby preventing the sum current from flowing into the vehicle battery pack 10 suddenly. In addition, the SOC of the vehicle battery pack 10 is controlled so that there is always a sufficient margin in the SOC of the vehicle battery pack 10 such that an optimized charging current acceptable to the charging station 20 is allowed to flow into the vehicle battery pack 10. Therefore, in cases where the sum current flows into the vehicle battery pack 10 when the refrigerator 12 stops suddenly without issuing the stop request, the vehicle battery pack 10 will be protected reliably.

(Modifications)

There will now be explained some modifications of each of the first to third embodiments that may be devised without departing from the spirit and scope of the present invention.

In each of the first to third embodiments, the refrigerator 12 is only one electrical load. Alternatively, the electrical load may be any kind of device that consumes an electrical current. The electrical load may include a vehicle air conditioner or a freezer or the like. In addition, the number of electrical loads may be more than one. In the case of a plurality of electrical loads, a sum current required to operate the loads may be calculated. Assuming that some of the loads are in operation and the others are not in operation, the vehicle ECU 13 may require the charging-station ECU 21 to supply a sum of a current for charging the vehicle battery pack 10 and currents for operating the respective operating loads.

In each of the first to third embodiments, the vehicle is the refrigerated vehicle. Alternatively, the vehicle may include a plug-in hybrid vehicle (PHV) with the vehicle battery pack 10, but without the refrigerator 12, or an electrical vehicle (EV) or the like.

Figure 5:
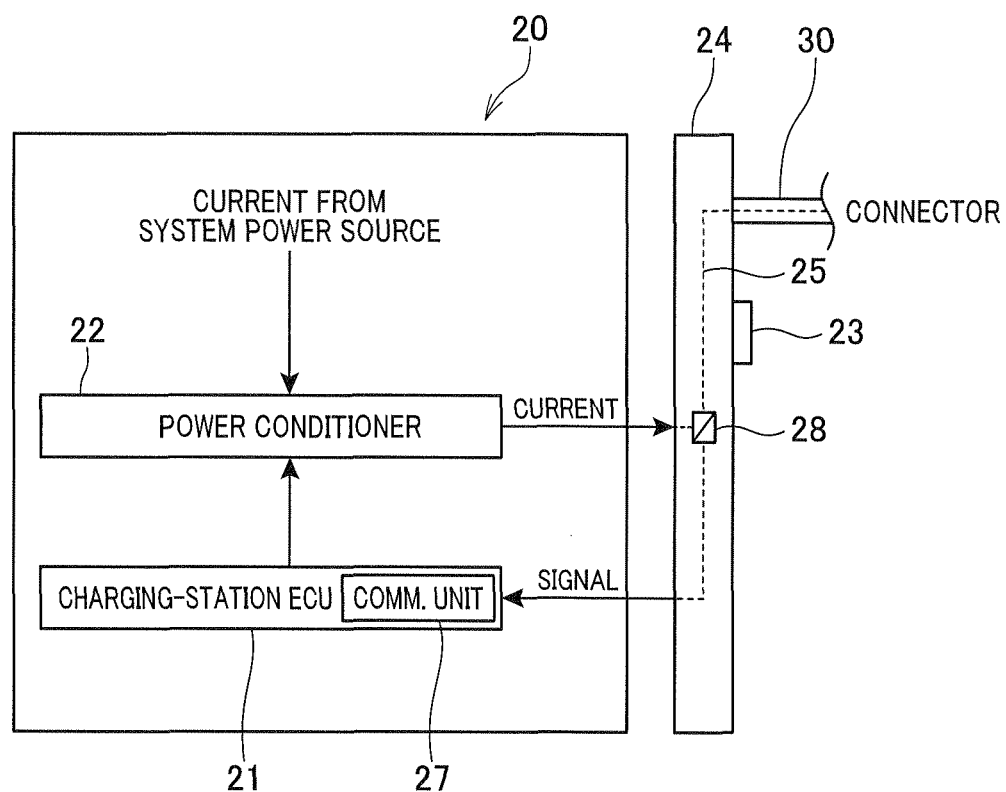
FIG. 5 schematically shows a charging cable via which a battery charging system and a charging station communicate with each other by using a power line communication (PLC) technique.

In addition, in each of the first to third embodiments, the communication unit 27 communicates with the vehicle via the communication cable 26 in the charging cable 30. Alternatively, as shown in FIG. 5, the communication unit 27 may communicate with the vehicle via the power-line 25 by using other communication methods, such as power line communications (PLC). For example, according to the PLC technique, a power line from the power conditioner 22 and a communication cable from the communication unit 27 in the charging-station ECU 21 are connected to a coupler 28 from which the power line 25 as the charging cable 30 extends to the connector 31, where the power line 25 splits into a communication cable and a power line on the vehicle side. The power line 25 is thus used for communications between the communication unit 27 and the vehicle.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A battery charging system for a vehicle, comprising:
a battery pack mounted in the vehicle;
a vehicle-mounted electrical load that can be driven by a current from the battery pack; and
a battery charge controller that controls charging of the battery pack, wherein:
when the battery pack is charged by using an external battery charger during operation of the load, the battery charge controller requires the external battery charger to supply a sum current that is a sum of a current for charging the battery pack and a current for driving the load to the system,
when the battery charge controller has received a stop request for stopping the load from the load during charging the battery pack by using the external battery charger, the battery charge controller requires the external battery charger to supply not the sum current, but the current for charging the battery pack, to the system, and
when a current supplied from the external battery charger to the system has decreased to the current for charging the battery pack, the battery charge controller allows the load to stop by issuing a stop allowance to the load.

2. The system of claim 1, further comprising:
a first current detector that detects a current supplied from the external battery charger to the load; and
a second current detector that detects a current supplied from the external battery charger to the battery pack,
wherein the current supplied from the battery charger to the system is given by a sum of the current detected by the first current detector and the current detected by the second current detector.

3. The system of claim 1, further comprising a battery monitor that monitors a battery state of the battery pack, wherein when the battery pack is charged by using the external battery charger during operation of the load and the battery state of the battery pack is close to a fully charged state, the battery charge controller requires the battery charger to supply not the sum current, but a current smaller than the sum current, to the system.

4. The system of claim 3, wherein
the battery state of the battery pack is specified by a state of charge (SOC) of the battery pack, and
the fully charged state is specified by a SOC of 100%.

5. The system of claim 4, wherein when the battery pack is charged by using the external battery charger during operation of the load and the SOC of the battery pack is equal to or larger than 90%, the battery charge controller requires the battery charger to supply not the sum current, but a current smaller than the sum current, to the system.

6. The system of claim 1, wherein
when the battery pack is charged by using the external battery charger, the system is electrically connected to the external battery charger via a charging cable of the external battery charger,
the system is supplied with the sum current from the external battery charger and communicates with the external battery charger via the charging cable during charging the battery pack, and
the battery charge controller transmits a current requirement corresponding to the sum current to the external battery charger via the charging cable.

7. The system of claim 6, wherein the charging cable comprises a signal line for communications between the system and the external battery charger and a power line for power supply from the external battery charger to the system.

8. The system of claim 6, wherein the charging cable comprises a power line for power supply from the external battery charger to the system, and
the system and the external battery charger communicate with each other via the power line by using a power line communication (PLC) technology.

9. A battery charging system for a vehicle, comprising:
a battery pack mounted in the vehicle;
a vehicle-mounted electrical load that can be driven by a current from the battery pack; and
a battery charge controller that controls charging of the battery pack, wherein:
when the battery pack is charged by using an external battery charger during operation of the load, the battery charge controller requires the external battery charger to supply a sum current that is a sum of a current for charging the battery pack and a current for driving the load to the system,
the battery charging system further comprises a battery monitor that monitors a battery state of the battery pack,
when the batter pack is charged by using the external battery charger during operation of the load and the battery state of the battery pack is close to a fully charged state, the battery charge controller requires the battery charger to supply not the sum current, but a current smaller than the sum current, to the system,
when the battery pack is charged by using the external battery charger during operation of the load, the battery state of the battery pack is not close to a fully charged state, and the battery charge controller has received a stop request for stopping the load from the load, the battery charge controller requires the external battery charger to supply not the sum current, but the current for charging the battery pack, to the system, and
when a current supplied from the external battery charger to the system has decreased to the current for charging the battery pack, the battery charge controller allows the load to stop by issuing a stop allowance to the load.

10. A battery charge controller for controlling charging of a battery pack mounted in a vehicle, comprising:
a sum current calculator that calculates a sum current that is a sum of a current for charging the battery pack and a current for driving a vehicle-mounted electrical load that can be driven by a current from the battery pack;
a current requester that, when the battery pack is charged by using an external battery charger during operation of the load, requires the external battery charger to supply the sum current calculated by the sum current calculator to the vehicle; and
a stop-request reception determiner that determines whether or not a stop request for stopping the load has been received from the load,
wherein when it is determined by the stop-request reception determiner that the stop request has been received from the load, the current requester requires the external battery charger to supply not the sum current, but the current for charging the battery pack, to the vehicle, and the controller further comprises:
a decrease-in-current determiner that determines whether or not a current supplied from the external battery charger to the vehicle has decreased to the current for charging the battery pack, and
a stop-allowance issuer that, when it is determined by the decrease-in-current determiner that the current supplied from the external battery charger to the vehicle has decreased to the current for charging the battery pack, issues a stop allowance to the load to allow the load to stop.

11. The controller of claim 10, further comprising:
a battery-state determiner that determines whether or not a battery state of the battery pack is close to a fully charged state,
wherein when the battery pack is charged by using the external battery charger during operation of the load and it is determined by the battery-state determiner that the battery state of the battery pack is close to the fully charged state, the current requester requires the external battery charger to supply not the sum current, but a current smaller than the sum current, to the vehicle.

12. The controller of claim 11, wherein
the battery state of the battery pack is specified by a state of charge (SOC) of the battery pack, and
the fully charged state is specified by a SOC of 100%.

13. The controller of claim 12, wherein
the battery-state determiner determines whether or not the SOC of the battery pack is equal to or larger than 90%,
when the battery pack is charged by using the external battery charger during operation of the load and it is determined by the battery-state determiner that the SOC of the battery pack is equal to or larger than 90%, the current requester requires the external battery charger to supply the current smaller the sum current to the vehicle.

14. A battery charger controller for controlling charging of a battery pack mounted in a vehicle comprising:
a sum current calculator that calculates a sum current that is a sum of a current for charging the battery pack and a current for driving a vehicle-mounted electrical load that can be driven by a current from the battery pack; and
a current requester that, when the battery pack is charged by using an external battery charger during operation of the load, requires the external battery charger to supply the sum current calculated by the sum current calculator to the vehicle;

a battery-state determiner that determines whether or not a battery state of the battery pack is close to a fully charged state, wherein:

when the battery pack is charged by using the external battery charger during operation of the load and it is determined by the battery-state determiner that the battery state of the battery pack is close to the fully charged state, the current requester requires the external battery charger to supply not the sum current, but a current smaller than the sum current, to the vehicle, the battery charge controller further comprises a stop-request reception determiner that determines whether or not a stop request for stopping the load has been received from the load after the determination of the battery-state determiner that the battery state of the battery pack is not close to the fully charged state, when it is determined by the battery-state determiner that the battery state of the battery pack is not close to the fully charged state and it is determined by the stop-request reception determiner that the stop request has been received from the load, the current requester requires the external battery charger to supply not the sum current, but the current for charging the battery pack, to the vehicle, and the controller further comprises:

a decrease-in-current determiner that determines whether or not a current supplied from the external battery charger to the vehicle has decreased to the current for charging the battery pack, and a stop-allowance issuer that, when it is determined by the decrease-in-current determiner that the current supplied from the external battery charger to the vehicle has decreased to the current for charging the battery pack, issues a stop allowance to the load to allow the load to stop.

* * * * *